United States Patent
MacDonald et al.

(10) Patent No.: US 7,515,765 B1
(45) Date of Patent: Apr. 7, 2009

(54) IMAGE SHARPNESS MANAGEMENT

(75) Inventors: Lindsay William MacDonald, Youlgrave (GB); Samira Bouzit, Fife (GB)

(73) Assignee: Apple Inc., Cupertino, CA (US)

( * ) Notice: Subject to any disclaimer, the term of this patent is extended or adjusted under 35 U.S.C. 154(b) by 996 days.

(21) Appl. No.: 10/920,585

(22) Filed: Aug. 18, 2004

Related U.S. Application Data

(63) Continuation of application No. 10/768,721, filed on Jan. 30, 2004, now abandoned.

(51) Int. Cl.
*G06K 9/40* (2006.01)
*G06K 9/36* (2006.01)

(52) U.S. Cl. .................................... 382/263

(58) Field of Classification Search ......... 382/232–253, 382/205, 254, 260–266, 268–269, 274–275, 382/162–167; 375/240.01–240.29; 358/1.9, 358/3.26–3.27, 517–518, 532, 426.01–426.16
See application file for complete search history.

(56) References Cited

U.S. PATENT DOCUMENTS

| | | | |
|---|---|---|---|
| 5,081,692 A | 1/1992 | Kwon et al. | |
| 5,682,443 A | 10/1997 | Gouch et al. | |
| 5,896,469 A | 4/1999 | Murakami | |
| 6,658,162 B1 * | 12/2003 | Zeng et al. | 382/251 |
| 7,035,473 B1 * | 4/2006 | Zeng et al. | 382/251 |
| 2003/0095716 A1 | 5/2003 | Gindele et al. | |
| 2003/0189579 A1 | 10/2003 | Pope | |
| 2003/0215155 A1 | 11/2003 | Serrano et al. | |
| 2004/0047514 A1 | 3/2004 | Gallagher et al. | |

FOREIGN PATENT DOCUMENTS

| | | |
|---|---|---|
| EP | 0344976 A1 | 12/1989 |
| EP | 0617548 A1 | 9/1994 |

* cited by examiner

*Primary Examiner*—Sherali Ishrat
(74) *Attorney, Agent, or Firm*—Schwegman, Lundberg & Woesnner, P.A.

(57) ABSTRACT

Methods, media, and a system provide image sharpness management for electronic images. Pixel values for an unmodified image are processed relative to spatial frequency bands for that image. An average pixel value is acquired for each of the spatial frequency bands and used to alter the corresponding pixel value of the image. A resulting modified image exhibits enhancement of sharpness, based on adjustments for each of the spatial frequency bands. In one embodiment, the average pixel value is adjusted based on an expected viewing distance of an observer. In another embodiment, the average pixel value is adjusted based on the ability of a display device to reproduce spatial frequencies in the image.

35 Claims, 4 Drawing Sheets

IMAGE SHARPNESS MANAGEMENT

CROSS-REFERENCE TO RELATED APPLICATION

This application is a continuation of U.S. patent application Ser. No. 10/768,721, filed Jan. 30, 2004 now abandoned, which application is incorporated herein by reference.

FIELD OF INVENTION

This invention relates generally to electronic image processing.

BACKGROUND

Electronic image quality can frequently be improved by making adjustments to image sharpness. Enhanced sharpness provides a crisper image with better object delineation and definition. In fact, enhanced sharpness is often desired because original scenes within an image can become degraded by optical losses and spatial sampling limits of the device that processes the image. Additionally, image processing applications with a digital computer, such as encoding, compressing, and the like can also cause detail within an image to be lost or distorted and can introduce noise. Furthermore, output devices (e.g., liquid crystal displays (LCDs)) can also corrupt image quality due to the bandwidth limitations of the electronic circuitry, physical cell structures and cross-talk between cells. The circuitry and cell structure may set an upper limit on the degree of spatial detail that can be reproduced within a given output device.

A human's visual capabilities can also affect one's perception of image quality. The human visual system is limited in its ability to resolve spatial detail in a scene because of the sampling characteristics of the retinal photoreceptors and the neural network of interconnections between them. Also, the human visual system has a built-in edge enhancement system that assists in the cognitive processes of image scene segmentation and interpretation. As a result, people prefer to see sharp images, which assist their interaction with, and understanding of, the natural world.

A conventional technique for image sharpening is referred to as unsharp mask (USM). USM generates an enhanced signal (fringe signal) from the difference between an original signal (sharp signal) at a single pixel and an average of signals (an average unsharp signal) that surround the pixel. A fraction of the fringe signal is then added to the sharp signal to produce an enhanced edge gradient. Although, decent improved sharpness can be achieved with USM, it is inflexible because it is limited to a single spatial frequency band within the image being processed and it takes no account of device or viewing characteristics.

Thus, there is a need for improved image sharpness management, which is not limited to a single spatial frequency band of an image being processed, and which allows compensation for device and human visual characteristics.

SUMMARY

Methods, media, and a system are provided to manage image sharpness. Adjustments to image sharpness are achieved by processing each pixel of an image based on average pixel values for a set of spatial frequency bands of that image. The average pixel values for each of the spatial frequencies are weighted, added, and normalized in order to obtain an adjustment value. For every pixel in the image, the adjustment value is added to the corresponding pixel value of the original image in order to produce a modified image with improved sharpness.

More specifically, and in one embodiment, a method is presented for managing image sharpness. An image is transformed into a plurality of spatial frequency bands. Average pixel values are calculated for each of the spatial frequency bands and each pixel value of the image is adjusted by a weighted sum of the average pixel values to generate a modified image.

DETAILED DESCRIPTION

Figure 1:
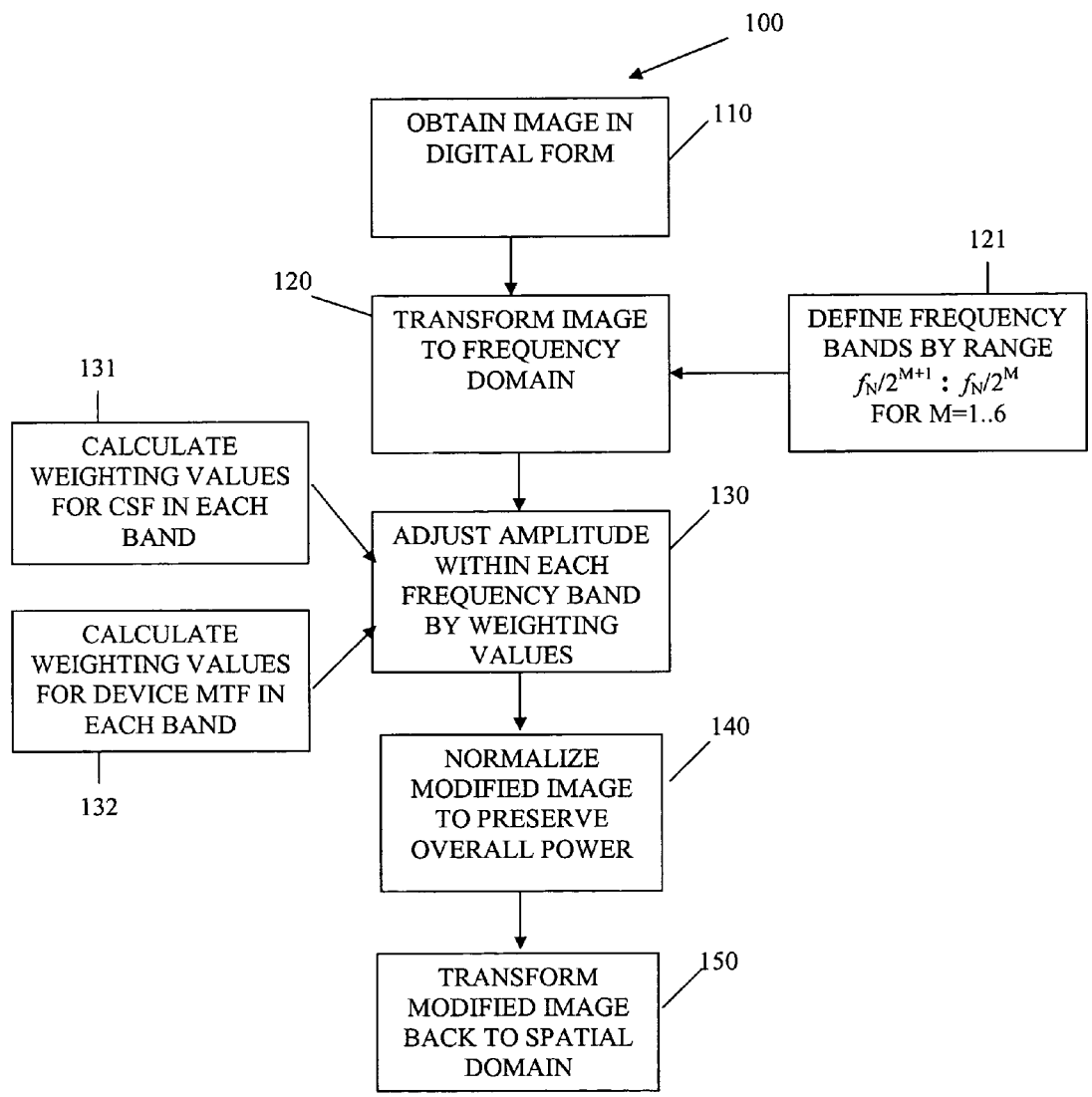
FIG. 1 is a flowchart of a method for adjusting an image's sharpness.

FIG. 1 is a flowchart of one method 100 for managing image sharpness. The processing of the method 100 is embodied in a computer-readable or accessible medium. In some embodiments, the processing of the method 100 is integrated into a processing device (e.g., computer, intelligent appliance (refrigerator, washer, stove, etc.), intelligent apparel (watch, glasses, helmets, etc.), peripheral (printer, facsimile, monitor, etc.), portable hand-held device (laptop, personal digital assistant, etc.), or other consumer imaging product (camera, phone, television, monitor, and the like). In other embodiments, the processing of the method 100 resides on a processing server that is remote from a device or display that presents an image to an observer.

An electronic image is defined by a plurality of pixels, the values of which represent the pointwise luminance of the scene depicted by the image. Each pixel may be represented by a single value for a monochrome image or by a plurality of values for the channels of color image (conventionally, red, green, and blue channels for a trichromatic image). The pixel density within the image is one factor related to image quality. Thus, higher pixel density generally results in better image quality. However, as previously discussed, the pixel values can become degraded or quantized in digital imaging systems, because of processing or hardware limitations of the devices that capture, process, store, transmit, or display the images. In order to improve the management of sharpness and object delineation within images, the embodiments of this invention uniquely enhance pixel values of an image based on the relative power of spatial frequencies associated with the image.

It should also be noted, that an image can and often is an accumulation of multiple sub-images. Thus, for purposes of this invention an image can include a single sub-image or can include a selective collection of sub-images arranged together. Moreover, an image need not reside contiguously within memory or storage. That is, an image can be logically assembled from non-contiguous memory and/or storage locations.

The processing of the method 100 processes each pixel of an image in turn. Accordingly, at 110, an image to be processed is initially obtained in digital form and made available for processing. Next, at 120, the image is transformed into the spatial frequency domain. A variety of well known and existing algorithms, such as the Fourier Transform, can be used in order to generate the power and phase at each spatial frequency of the image and map them to a two-dimensional space (e.g., u and v axis). The spatial frequencies are then grouped into sets of bands, represented in the frequency domain by a set of annular concentric regions. In one embodiment, each band spans a 2:1 frequency range, and thus represents one octave of spatial frequency. Typically, five to seven such octave bands below the Nyquist frequency $f_N$, each defined by the ratio between lowest and highest frequencies of $f_N/2^{M+1}$: $f_N/2^M$ for M=1 . . . 6, would be sufficient to cover the useful range of spatial frequencies within an image, as depicted at 121. The last band should include all lower frequencies, including the DC component. At 130, the amplitude of each spatial frequency band is adjusted by a multiplicative weighting value according to the desired emphasis of each individual spatial frequency band. In some embodiments, the weighting value for each spatial frequency band includes factors for an ideal or desired Contrast Sensitivity Function (CSF) value, calculated at 131, and a ratio between an ideal and desired Modulation Transform Function (MTF) value for a device, calculated at 132. The adjusted image, still in the frequency domain, is then normalized, at 140, so that the total power of the image is equal to that of the unmodified image in 120 in order to preserve its average luminance. Finally the image is transformed back into the normal spatial domain, at 150, for example by the application of an inverse Fourier transform.

In some embodiments of the invention, the image is treated in the frequency domain as a continuous function of two-dimensional space, and the weighting functions for CSF and MTF are applied as continuous radial functions of spatial frequency. This removes the need to calculate average values of CSF and MTF within each discrete frequency band.

Figure 2:
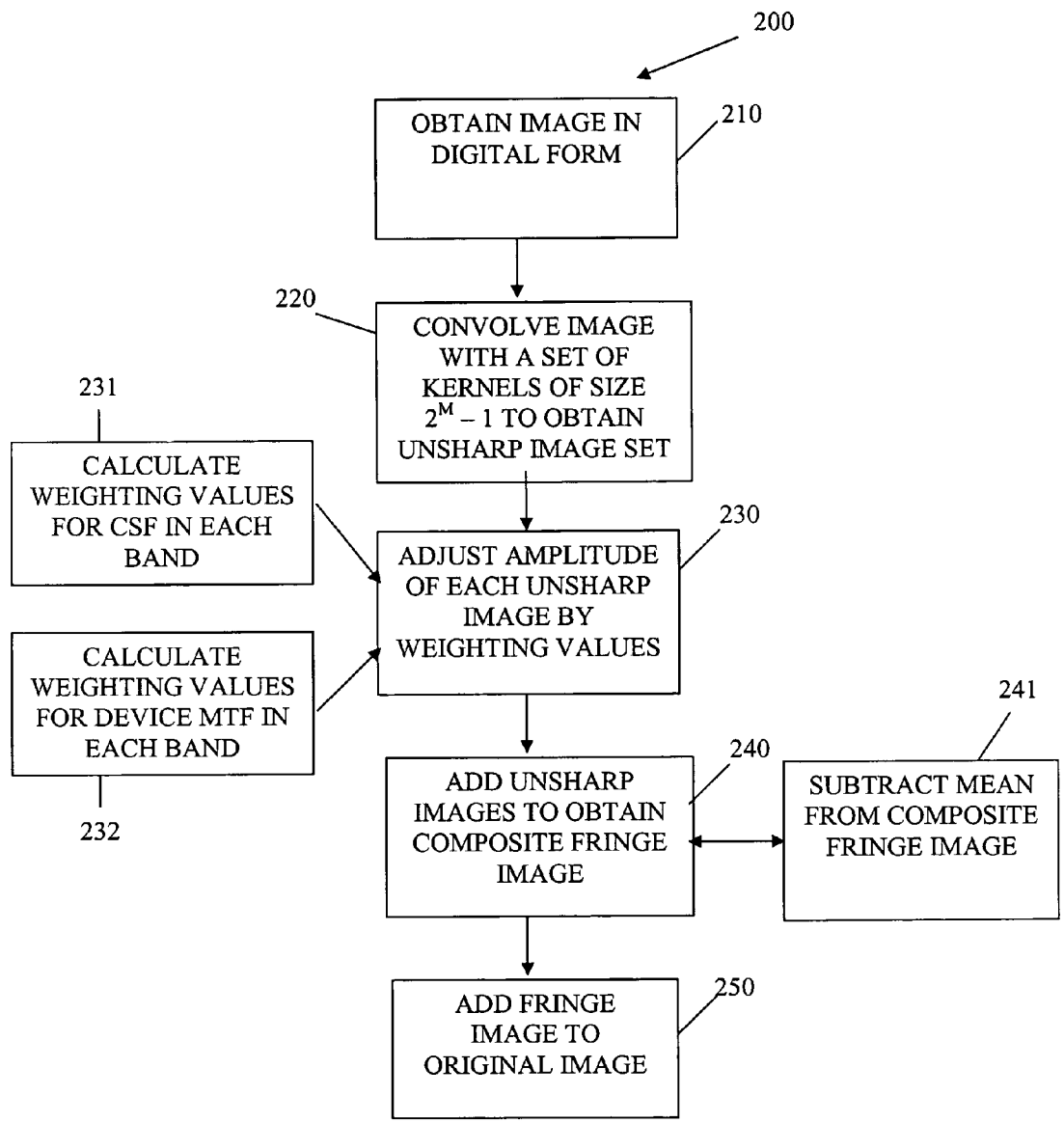
FIG. 2 is a flowchart of another method for adjusting an image's sharpness.

FIG. 2 illustrates a flowchart of another method 200 of the invention. The processing of the method 200 can occur within an image device or can occur separately from an image device, such as on a remote processing device directly interfaced to the image device or networked across a network to the image device. Furthermore, the method 200 processing can be embedded within hardware or firmware of an image device or installed as software (e.g., operating system, image processing system, etc.) on the image device.

As shown in method 200, the spatial frequency bands of the original image, at 210, are extracted directly by convolution, at 220, in the spatial domain, without the need of transforming to the frequency domain. The image is convolved with a set of kernels having diameters defined by $2^{M+1}-1$ pixels, where M is an integer that begins at 1 and continues to 6 or greater. Thus, the power in successive spatial frequency bands of the original image is represented in so-called unsharp images filtered by kernels of size 3×3, 7×7, 15×15, 31×31, 63×63 and so on. The kernels may have all coefficient values equal to 1 for computing a simple average of the surrounding pixel values, or may be weighted in various ways, in particular by the radial since function defined by sin(r)/r where r is the radius in pixels. The kernel sizes, coefficient values and number of spatial frequencies in the series may be chosen in different ways, and one of ordinary skill in the art understands that at a minimum of 2 or more kernel sizes can be used with the embodiments of this invention (conventional techniques only sharpen images with respect to a single spatial frequency).

At 230, the amplitude of each unsharp image is adjusted by a multiplicative weighting value according to the desired emphasis of the corresponding spatial frequency band. In some embodiments, the weighting value for each spatial frequency includes factors for an ideal or desired Contrast Sensitivity Function (CSF) value, calculated at 231, and a ratio between an ideal and desired Modulation Transform Function (MTF) value for a device, calculated at 232. A so-called fringe image is then formed, at 240, by the summation of the weighted unsharp images, normalized to have zero mean over the whole image area. In one embodiment, at 241, the mean can be subtracted from the composite fringe image. The fringe image is added to the original image, at 250, to produce the desired sharpened image. One of ordinary skill in the art readily understands that the operations at steps 230, 240 and 250 may be performed on a pixel-by-pixel basis in any convenient order.

Figure 3:
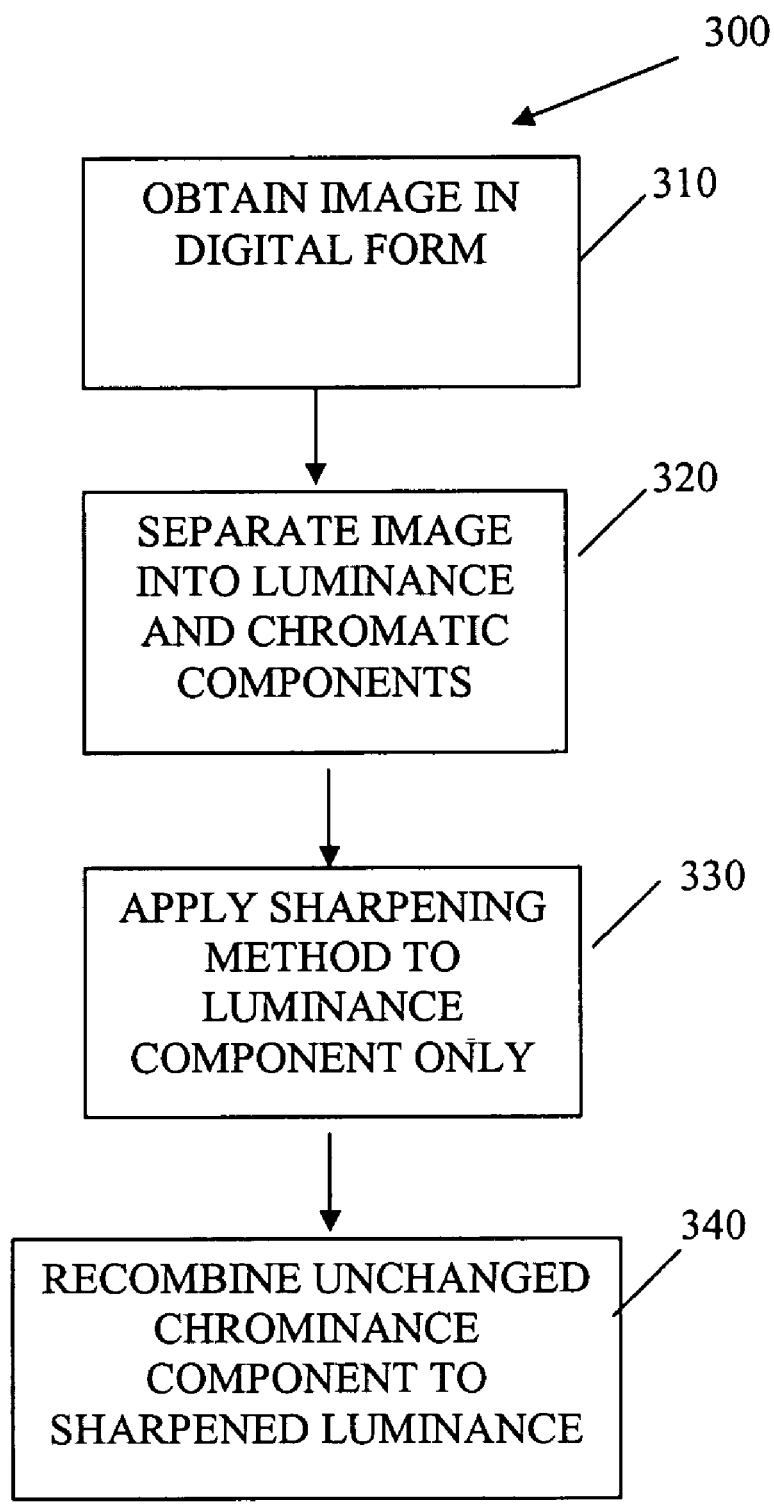
FIG. 3 is a flowchart of a method for adjusting an image's sharpness in which a luminance component of that image is adjusted.

FIG. 3 is a flowchart of one method 300 for adjusting an image's sharpness in which a luminance component of that image is adjusted. In one embodiment, the method 300 is an implementation of either method 100 or method 200 of FIGS. 1 and 2, respectively, in which only a luminance component is adjusted. Again, the method can reside in and be implemented on a computer readable or accessible media. That media can be removable (e.g., CD, DVD, diskette, memory stick, flash memory, etc.) or fixed storage. The media can also be combinations of memory and storage.

As shown in method 300, the original image, at 310, is first separated, at 320, into chromatic and luminance components, for example by one of the transformations defined by the well known CIE system of colorimetry. Either sharpening method 100 or 200 then uses and modifies, at 330, only the luminance component. The chromatic components are recombined unchanged with the modified luminance component when the image is reconstructed, at 340. This is done for the purpose of minimizing the number and complexity of the computations needed to sharpen an image. However, one of ordinary skill in the art recognizes that this need not always be the case, since in some embodiments, the chromatic components can also be altered in manners similar to what is disclosed herein to achieve other beneficial results. Moreover, the sharpening method may be applied to a non-linear function of luminance, such as CIE lightness.

A CSF value represents the spatial contrast sensitivity in an average observer, and is indicative of the human visual response to spatial frequency content in the eye's field when viewing a pattern or image. Many existing techniques and experimental methods have been developed to determine CSF values. One embodiment of the present invention uses a known mathematical model developed by Barten to approximate a typical CSF value:

$$CSF(u)=au^{-bu}\sqrt{1+c^{bu}};$$

where $a = \dfrac{540\left(\dfrac{1+0.7}{L}\right)^{-0.2}}{1+\dfrac{12}{\omega\left(1+\dfrac{u}{3}\right)^2}}$, $b = 0.3\left(1+\dfrac{100}{L}\right)^{0.15}$, and $c = 0.06$.

L is the average display luminance in cd/m², ω is the angular display size in degrees, calculated as the square root of the picture area; u is the spatial frequency of the pattern at the observer's eye in cycles/degree; a describes the low-frequency behavior of the CSF, and b and c the high-frequency behavior. The value b depends on the visual acuity of the observer. Moreover, for a display of image width dh and a fixed viewing distance of l, the horizontal angle $\omega_h$ subtended at the eye of the observer (in degrees) is given by:

$$\tan\Phi = \frac{\omega_h}{2} = \frac{\frac{d_h}{2}}{l}.$$

For small angles (on the scale of a single pixel) $\omega \cong \omega$ and can be approximated as:

$$w_{pixel} = \frac{d_{pixel}}{l}(\text{rad}) = \frac{180}{\Pi l}\frac{d_{pixel}}{}(\text{deg}).$$

The angular spatial frequency u subtended at the eye of the observer by a pattern of linear spatial frequency v is thus determined by:

$$u = \frac{n}{\omega} = \frac{nl}{d} = vl\left(\frac{c}{\text{rad}}\right) = \frac{\Pi vl}{180}\left(\frac{c}{\text{deg}}\right).$$

These formulae permit a desired mean CSF value to be calculated for each spatial frequency based on the desired viewing distance (l) of an average observer. The average value of CSF within a given spatial frequency band can then easily be determined.

In a like fashion a desired mean Modulation Transfer Function (MTF) ratio value can be obtained and used as a weight for each of the spatial frequency bands. MTF is a standard technique to characterize an optical system. For each spatial frequency, the modulation transfer is computed as the ratio between image and object contrasts. Although CSF and MTF may appear on the surface to be similar, there are some significant differences, namely that CSF measures a human's ability to perceive spatial frequencies whereas MTF measures an image device's ability to reproduce spatial frequencies. A device's MTF function can be measured or may be provided with manufacturer's literature associated with a device. Existing techniques have produced MTF graphs that depict lower and upper acceptable bounds on MTF values at various spatial frequencies up to and beyond the Nyquist limit associated with the image sampling frequency. For the purposes of various embodiments of this invention, the ideal MTF for any particular spatial frequency being evaluated has a value obtained from a curve interpolated in between the upper and lower MTF limits.

Thus, a weighted mean value for each spatial frequency band can be obtained for CSF and for MTF. The weighted values can be used as multipliers to the power of the image in the corresponding spatial frequency bands, at 130 or 230. In some embodiments, only MTF weights are used to adjust the amplitude of the spatial frequency bands. In other embodiments, only CSF weights are used to adjust the amplitude of the spatial frequency bands.

In order to preserve the overall power of the sharpened image, different techniques are used according to the method 100 or 200. The normalizing technique at 140, applied in the frequency domain, is achieved by multiplying the adjusted amplitude of each spatial frequency band by the sum of the weighting values used at 130. Thus, where the weights are added to give a total K, the normalizing factor is then 1/K. Another technique at 240, in the spatial domain, calculates the weighted sum of unsharp images to produce a composite fringe image. The mean value of the fringe image is computed, at 241, as a summation of the fringe values for all pixels in the image. This mean value is then subtracted from the fringe image before the composite fringe image is added to the original image, at 250.

As an example of an embodiment of method 100 of this invention, consider an image converted into the frequency domain by applying a Fourier transform. Six spatial frequency bands are defined relative to the pixel sampling frequency $f_N$, defined by the octave ratios $B_6=\{0:f_N/64\}$, $B_5=\{f_N/64: f_N/32\}$, $B_4=\{f_N/32:f_N/16\}$, $B_3=\{f_N/16:f_N/8\}$, $B_2=\{f_N/8:f_N/4\}$, $B_1=\{f_N/4:f_N/2\}$. $B_1$ represents the highest spatial frequency octave up to the Nyquist frequency $f_N/2$, and $B_6$ represents the lowest spatial frequency octave including all lower spatial frequencies down to the constant (DC) component. These bands may be extracted in the frequency domain by means of an annular band-pass filter, centered on the origin, for which the inner and outer radii are in the corresponding 2:1 ratio.

Consider that for each spatial frequency band there have been calculated weighting values for CSF, defined by $C_1$, $C_2$, $C_3$, $C_4$, $C_5$, and $C_6$. Also, for each spatial frequency band there have been determined weighting values for MTF, defined by $M_1$, $M_2$, $M_3$, $M_4$, $M_5$, and $M_6$. The amplitude of each spatial frequency band of the image is then adjusted by a multiplicative weighting value according to the desired emphasis of each individual spatial frequency band. The adjusted image L', still in the frequency domain, may be represented as:

$$L'=\alpha(C_1M_1B_1+C_2M_2B_2+C_3M_3B_3+C_4M_4B_4+C_5M_5B_5+C_6M_6B_6)$$

$$\alpha = \frac{1}{\sum_i C_i M_i},$$

where $\alpha$ is a normalizing factor, given by which maintains the average luminance in the processed image to be the same as that of the original image.

The image is transformed back into the normal spatial domain by application of an inverse Fourier transform. The sharpened image is then formed by a linear interpolation between the original and adjusted images, according to the equation:

$$L_{sharp}=(1-\beta)L_{original}+\beta L_{adjusted}$$

where $L_{sharp}$ is the sharpened image, $L_{original}$ is the original image, $L_{adjusted}$ is the adjusted image, and $\beta$ is a coefficient in the range [0,1] to enable control over the degree of sharpening. Thus, $\beta$ is a configurable value that can be selected by the user to control the sharpening effects of various embodiments associated with this invention.

As an example of an embodiment of method 200 of this invention, consider an image from which six spatial frequency bands are extracted from unsharp versions of the original image created by filtering by convolution of the original image with kernels of sizes 1×1, 3×3, 7×7, 15×15, 31×31, and 63×63. The unsharp images corresponding to each of these frequencies are denoted as $L_1$, $L_3$, $L_7$, $L_{15}$, $L_{31}$, and $L_{63}$. Also, consider that for each spatial frequency band there have been calculated weighting values for CSF, defined by $C_1$, $C_3$, $C_7$, $C_{15}$, $C_{31}$, and $C_{63}$. Also, for each spatial frequency band there have been determined weighting values for MTF, defined by $M_1$, $M_3$, $M_7$, $M_{15}$, $M_{31}$, and $M_{63}$. The fringe image may then be calculated as:

$$L_{C\_M}=\alpha\Sigma C_i M_i L_i$$

where (i=1, 3, 7, 15, 31, 63) and a is a normalising factor, given by $$\alpha = \sum_i 6/C_i M_i.$$

The fringe signal has the effect of increasing the contrast gradient at edge contours within the modified image. The mean fringe value, computed over the whole fringe image, is then subtracted from the fringe image to yield a zero-mean fringe, in order to equalize the enhancement of both positive and negative contrast gradients. The final modified image is produced by adding a proportion of the zero-mean fringe image to the original image to produce a sharpened image. This can be expressed as:

$$L_{sharp} = L_{original} + \beta(L_{C\_M} - \overline{L_{C\_M}})$$

where $L_{sharp}$ is the sharpened image, $L_{original}$ is the original image, $L_{C\_M}$ is the fringe image, $\overline{L_{C\_M}}$ is its average value, and the difference ($L_{C\_M} - \overline{L_{C\_M}}$) represents the zero-mean fringe image. $\beta$ is a coefficient in the range [0,1] to enable control over the degree of sharpening. Thus, $\beta$ is a configurable value that can be selected by the user to control the sharpening effects of various embodiments associated with this invention. In some embodiments, the computation may be performed on a pixel-by-pixel basis.

The techniques for adjusting pixel values of an image presented above can be used to improve image sharpness in order to compensate for spatial losses occurring on devices that process or display the image. These adjustments can be reflected in the ideal MTF weighting values for each frequency band. Furthermore, the techniques can be used to enhance sharpness based on a desired viewing distance with which an average observer views the image. These adjustments can be reflected in the calculated CSF weighting values for each frequency band, where the CSF weighting value is a function of a desired viewing distance, the physical dimensions and luminance level of a display that presents the image, and other factors relating to the viewing environment.

Image appearance can be substantially improved by applying the sharpening techniques presented with the processing of the methods 100 and 200. In fact, the sharpness of an image is arguably a more important factor in image appearance than is color, in the sense that degradation of sharpness will generally make the image less acceptable than degradation of color. However, conventionally, sharpness is often overlooked as a significant factor in image reproduction, with the assumption being that sharpness will be dealt with by other user-initiated software and is therefore outside the control of any image reproduction delivery system. Some user tools do permit users to alter an image's sharpness, but these functions typically sharpen images based on a fringe signal calculated from a single spatial frequency band. Moreover, these sharpening features are generally not embedded within the computer operating systems or other image delivery systems that deliver an image from its source to a destination display device. The techniques presented with the processing of the methods 100 and 200 can be implemented in image reproduction and delivery systems (e.g., computer software operating systems) in order to improve or enhance the appearance of images. This is done by managing image sharpness based on image device characteristics and/or based on a desired or expected distance with which images are viewed.

The processing of the methods 100 and 200 may occur within an image device or separately from an image device, such as on a remote processor directly interfaced to the image device or connected across a network to the image device. The processing methods 100 and 200 may be embedded within the hardware or firmware of an image device or installed as software (e.g., computer operating system, image processing system, etc.) on the image device. The image may be processed by the methods 100 and 200 by treating each pixel in turn, or in rows, in columns, or in blocks of arbitrary size, according to considerations of efficiency of implementation.

By making modifications to the pixel values for all pixels of an image, the relative amplitude in each of the frequency bands can be adjusted in order to achieve compensation relative to any desired frequency spectrum of the image. Additionally, the pixel modifications can be used to compensate for spatial losses incurred by an image digitizing device (e.g., camera, scanner, etc.) or an image display device (e.g., monitor, screen, etc.), by effectively adjusting the image's power spectrum by a ratio at each spatial frequency. The ratio is defined as a device's actual Modulation Transfer Function (MTF) characteristic versus an ideal or desired MTF characteristic.

Further, the pixel modifications can be used for enhancing the sharpness of the overall image, where the sharpness is enhanced based on a desired or expected distance that the image will be viewed by an observer. This is achieved by adjusting the image power spectrum at each spatial frequency by a function of a contrast sensitivity characteristic (e.g., CSF value) calculated for an average observer of the image at an expected viewing distance.

The embodiments of methods 100 and 200 can be used extend device profiles so as to include spatial device characteristics. Conventionally, device profiles used by color management systems include only tone and color characteristics of the device. The spatial device characteristics (MTF) can be configured by the operating software or hardware to adjust each frequency band of each image processed by the methods 100 or 200, so as to achieve desired effects for image display or reproduction. Users or manufacturers of devices or images can access the spatial device characteristics to specify a rendered image's preferred sharpness or to define a preferred viewing distance with which the image is to be viewed. The result is that the image (rendered in either color or grayscale) has improved sharpness and looks more appealing to the observer. Conventionally, sharpness was adjusted in a simplistic way, based on a single frequency and not all frequencies of an image. Thus, the techniques presented with embodiments of this invention provide improved image sharpness management and enhancement beyond what has been conventionally achieved.

Figure 4:
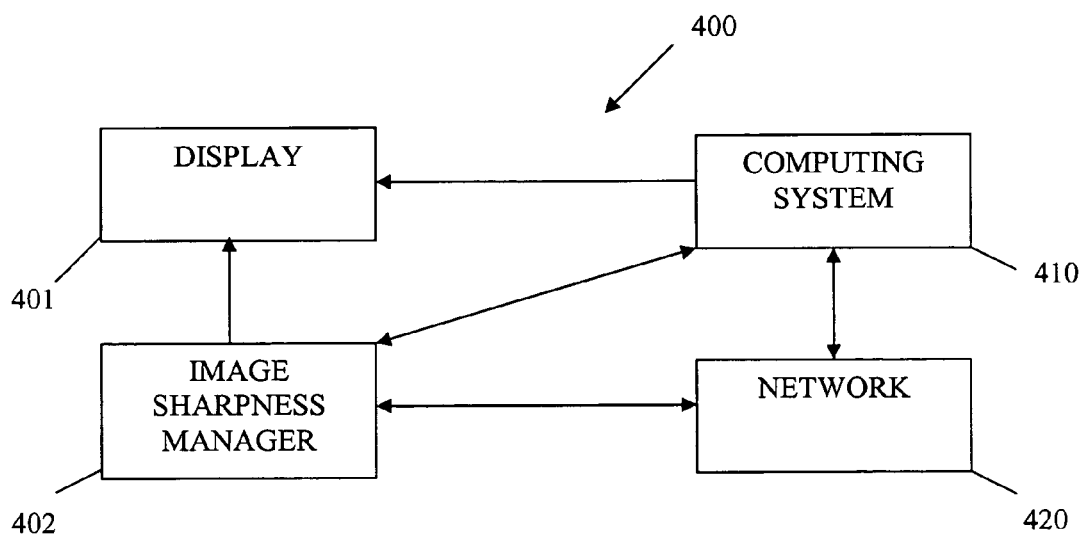
FIG. 4 is a diagram of an image sharpness management system.

FIG. 4 is a diagram of an image sharpness management system 400, which can be implemented within a hardware device as firmware or independent of any specific device as software instructions that are operable to execute on a hardware device. Thus, the image sharpness management system 400 can be wholly contained and the processing implemented within an image device, or the processing can be effected remotely and the processed image communicated independently to an image display for presentation.

The image sharpness management system 400 includes a display 401 and an image sharpness manager 402. The image sharpness manager 402 may be installed on a computing system 410 that is local or integrated with the display 401. Alternatively, the image sharpness manager 402 may reside and process remotely from a computing system 410 that is integrated or in communication with the display 401. In this latter embodiment, the image sharpness manager 402 can be accessed on a remote device over a network 420 to present a rendered image directly to the display 401 or to an integrated computing system 410 for communication to the display 401.

The display 401 is used for presenting digital images. The display 401 can be any monitor or smart monitor with integrated processing capabilities. In one embodiment, the display 401 is a conventional liquid crystal display (LCD) monitor. However, the display 401 can be constructed of any other technology, such as a television, plasma, Cathode Ray Tube (CRT), and the like.

The image sharpness manager 402 communicates directly or indirectly with the display 401 via a computing system 410 in which the image processing operations are performed. The image sharpness manager 402 receives an image for processing. The image can be identified by or sent by the computing system 410, or by another device connected to the network 420, or by any other removable or portable computer-readable medium that is in communication with the image sharpness manager 402.

Once the image sharpness manager 402 has an image for modification, MTF characteristics of the display 401 can optionally be supplied or preconfigured within the logic of the image sharpness manager. Thus, in some embodiments, the MTF characteristics can be supplied to the image sharpness manager 402 in the same manner used for acquiring the image. For example, the MTF characteristics can be attached to metadata of the image and immediately be made available when the image sharpness manager 402 receives the image for processing. The MTF characteristics are used to weight frequency bands in the image that is being processed in order to achieve desired sharpness enhancement characteristics. This is achieved by modifying each pixel of the image to be processed in the manner described herein and below.

In some embodiments, the image sharpness manager 402 also acquires or calculates based on supplied or preconfigured values a CSF value for the image being processed. The CSF value can also be used to weight frequency bands in the image that is being processed and is often calculated based on a desired or expected viewing distance with which an observer will view the image being rendered by the image sharpness manager 402.

The image sharpness manager 402 uses existing image transform utilities to transform the image into its respective spatial frequency bands. In some embodiments, this results in the original image being represented in a two-dimensional frequency domain, in which each frequency band represents a distinct range of spatial frequencies in the image that have a visual significance for the observer. Any desired MTF and CSF values are then calculated for each of these frequency bands and weighted accordingly.

Next, for each frequency band the average pixel value is calculated and multiplied by its respective weighted MTF and CSF values. The sum of all these calculations is calculated into a single normalized or averaged value, in manners similar to that discussed above with reference to FIGS. 1 and 2.

The adjustment to each pixel of the image based on a weighted sum of the values associated with each of the spatial frequency bands results in adjustments to the sharpness of the overall image. The sharpness level can be controlled selectively based on MTF characteristics and/or CSF characteristics provided to or calculated by the image sharpness manager 402. Any desired MTF characteristics instruct the image sharpness manager 402 to weight each of the spatial frequencies properly so as to achieve the desired effect. Further the CSF characteristics can be weighted to account for an image that is best viewed from a defined or expected viewing distance.

Additionally, the adjustment to the pixel values for each pixel of the image provides the ability to compensate for image spatial losses incurred as a result of limitations of an image or computing system 410 or as a result of limitations of the display 401 (e.g., represented by MTF characteristics). Adjustments can be made based on provided or ideal MTF characteristics versus the actual MTF characteristics of the computing system 410 or the display 401. In this way, the limitations of the computing system 410 or display 401 can be overcome by the pixel processing of the image sharpness management system 400.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) requiring an Abstract that will allow the reader quickly to ascertain the nature and gist of the technical disclosure. It is submitted with the understanding that it will not be used to interpret or limit the scope or meaning of the claims.

In the foregoing description of the embodiments, various features have been grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method comprising:
    using at least one processor to perform steps, comprising,
        transforming an image into a plurality of spatial frequency bands;
        calculating average values for each of the spatial frequency bands;
        weighting each of the spatial frequency bands by a Modulation Transfer Function (MTF) ratio value; and
        after said weighting, adjusting a relative amplitude of different ones of the spatial frequency bands to generate a modified image using an adjustment value associated with the average values.

2. The method of claim 1 further comprising the step of defining the spatial frequency bands in octaves by the ratios $f_N/2^{M+1}:f_N/2^M$ for M=1 . . . 6 where $f_N/2$ is a Nyquist frequency of the sampling method.

3. The method of claim 1 further comprising the step of defining each spatial frequency band sufficiently for the plurality of spatial frequency bands to approximate a continuous function of spatial frequency.

4. The method of claim 1 further comprising the step of weighting each of the spatial frequency bands by a Contrast Sensitivity Function (CSF) value before performing the adjusting.

5. The method of claim 1 further comprising the step of separating the image into luminance and chromatic components, and then processing the method with the luminance component, where the chromatic component remains unchanged.

6. The method of claim 1 further comprising the step of normalizing the modified image to preserve an overall power of the image.

7. The method of claim 1 wherein the step of adjusting further includes normalizing a total average of the average values to preserve an original average lightness associated with the image.

8. The method of claim 1 further comprising the step of scaling the adjustment value by a configurable and selectable sharpness factor.

9. A method comprising:
using at least one processor to perform steps comprising,
transforming an image into a plurality of spatial frequency bands;
calculating an average pixel value at each of the spatial frequency bands;
calculating a mean Contrast Sensitivity Function (CSF) value at each of the spatial frequency bands;
calculating a mean Modulation Transfer Function (MTF) ratio value at each of the spatial frequency bands;
combining each average pixel value, each mean CSF value, and each MTF ratio value into an adjustment value; and
adding the adjustment value to each pixel value of the image to generate a modified image.

10. The method of claim 9 wherein the step of transforming further includes generating the spatial frequency bands by a set of convolution kernels of diameter $2^M-1$ pixels, wherein M is an integer that begins at 1 and continues to 6 or greater.

11. The method of claim 9 wherein the step of adding further includes adding a non-linear function of a weighted sum of the average values for each of the spatial frequency bands to each of the pixel values.

12. The method of claim 9 wherein the step of calculating of the mean CSF value at each of the spatial frequencies further includes using an expected viewing distance of an average observer who views the modified image.

13. The method of claim 9 wherein the step of calculating of the mean MTF value at each of the spatial frequencies further includes using an ideal MTF value for a display that presents the modified image.

14. The method of claim 9 wherein the step of combining further includes obtaining a total average for each of the average pixel values, each of the mean CSF values, and each of the MTF values, and wherein the total average is the adjustment value.

15. The method of claim 9 further comprising the step of separating the image into luminance and chromatic components, then processing the method with the luminance component, where the chromatic component remains unchanged.

16. The method of claim 9 wherein the step of adjusting further includes multiplying by a customized sharpness factor in the range of 0 to 1.

17. A system, comprising:
a display to present an image;
an image sharpness manager that communicates with the display, wherein the image sharpness manager is configured to:
process each pixel of the image relative to a plurality of spatial frequency bands, and adjust the value of each processed pixel based on a function of weighted values of the spatial frequency bands, wherein the function comprises at least one factor for a Modulation Transfer Function ratio value.

18. The system of claim 17 further comprising a device that implements the image sharpness manager, wherein the device is at least one of a digital camera, a phone, an appliance, intelligent apparel, a computing device, a computing peripheral device, and a television.

19. The system of claim 17, wherein each spatial frequency band is defined by a region of diameter $2^M-1$ pixels, where M is an integer number that begins with 1 and continues to at least 6.

20. The system of claim 17, wherein the image sharpness manager is configured to adjust the value for each processed pixel to enhance the image for at least one of contrast, spatial losses, and sharpness.

21. The system of claim 17, wherein the function further comprises at least one factor for a mean Contrast Sensitivity Function (CSF) value in each of the spatial frequency bands.

22. The system of claim 17, wherein the image sharpness manager is configured to adjust the value for each processed pixel to alter the image based on an expected viewing distance of an observer.

23. The system of claim 17, wherein the image sharpness manager is configured to separate the image into luminance and chromatic components, and to then adjust the luminance component of each pixel value, without changing the chromatic component.

24. A computer readable medium having instructions thereon, which, when the instructions are executed by a computer perform a method, the method comprising:
transforming an image into a plurality of spatial frequency bands;
calculating average values for each of the spatial frequency bands;
weighting each of the spatial frequency bands by a value based at least in part on a Modulation Transfer Function (MTF) ratio value; and
adjusting a relative amplitude of different ones of the spatial frequency bands using the average and weighted values to generate a modified image.

25. The medium of claim 24 further comprising the instructions of: separating the image into luminance and chromatic components, and subsequently executing the further instructions on the medium only with respect to the luminance component, where the chromatic component remains unchanged.

26. The medium of claim 24 wherein the instructions further comprise weighting each of the spatial frequency bands in part by a Contrast Sensitivity Function (CSF) value.

27. The medium of claim 26 wherein the weighting instructions further include defining the CSF value based on an expected viewing distance of an average observer who views the modified images and defining the MTF ratio value based on an ideal MTF ratio value for a display that presents the modified image.

28. A method comprising:
using at least one computing device to perform steps comprising,
transforming an image into a plurality of spatial frequency bands;
calculating an average pixel value at each of the spatial frequency bands;
calculating a mean Contrast Sensitivity Function (CSF) value at each of the spatial frequency bands;
calculating a mean Modulation Transfer Function (MTF) ratio value at each of the spatial frequency bands;
combining each average pixel value, each mean CSF value, and each MTF ratio value into an adjustment value; and
adding the adjustment value to each pixel value of the image to generate a modified image.

29. The method of claim 28 wherein the step of transforming step further includes generating the spatial frequency bands by a set of convolution kernels of diameter $2^M-1$ pixels, wherein M is an integer that begins at 1 and continues to 6 or greater.

30. The method of claim 28 wherein the step of adding step further includes adding a non-linear function of a weighted sum of the average values for each of the spatial frequency bands to each of the pixel values.

31. The method of claim 28 wherein the step of calculating of the mean CSF value at each of the spatial frequencies further includes using an expected viewing distance of an average observer who views the modified image.

32. The method of claim 28 wherein the step of calculating of the mean MTF value at each of the spatial frequencies further includes using an ideal MTF value for a display that presents the modified image.

33. The method of claim 28 wherein the step of combining further includes obtaining a total average for each of the average pixel values, each of the mean CSF values, and each of the MTF values, and wherein the total average is the adjustment value.

34. The method of claim 28 further comprising the step of separating the image into luminance and chromatic components, then processing the method with the luminance component, where the chromatic component remains unchanged.

35. The method of claim 28 wherein the step of adjusting further includes multiplying by a customized sharpness factor in the range of 0 to 1.

\* \* \* \* \*